Feb. 13, 1962 J. C. FAGLIE 3,021,453
POLYPHASE ELECTRORESPONSIVE APPARATUS
Filed Jan. 12, 1959 2 Sheets-Sheet 1

INVENTOR
JACK C. FAGLIE

BY Carlsen & Hagle
ATTORNEYS

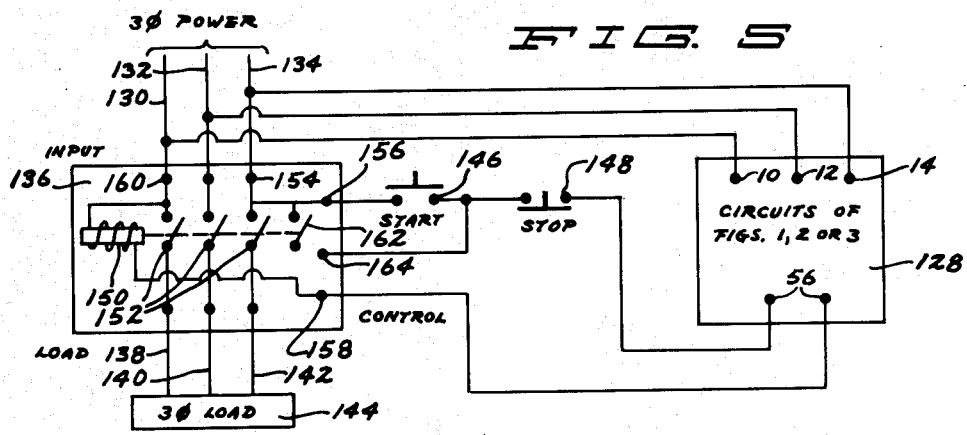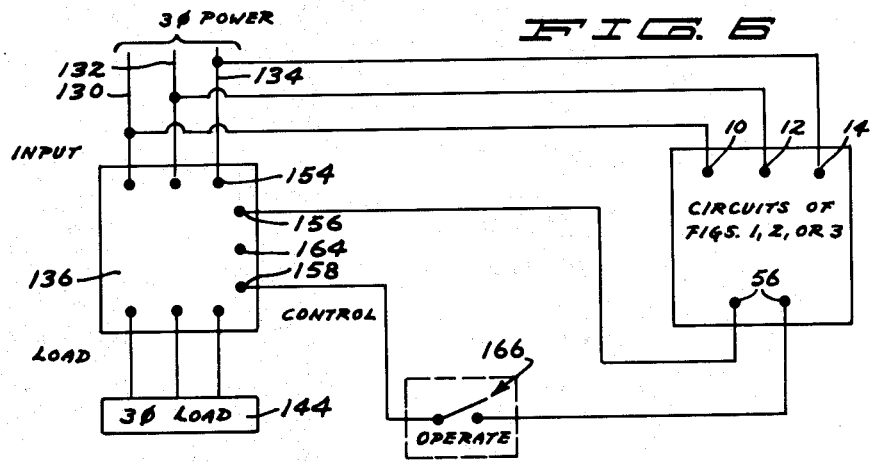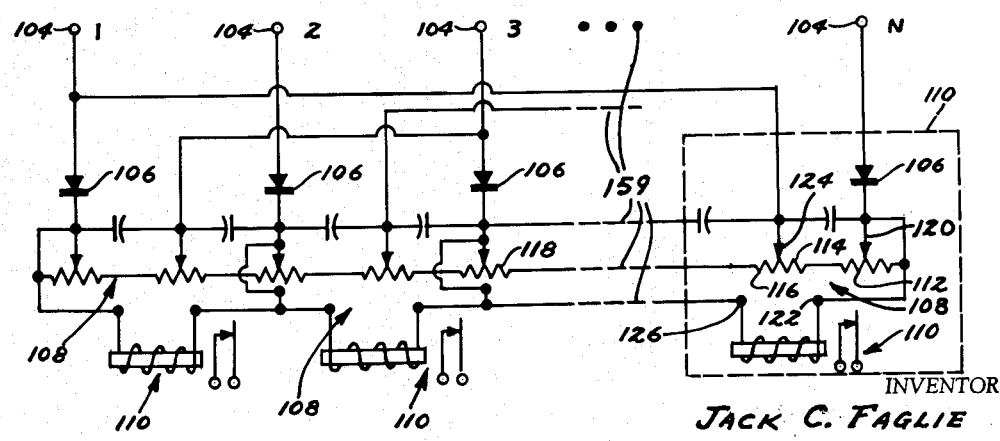

United States Patent Office 3,021,453
Patented Feb. 13, 1962

1

3,021,453
POLYPHASE ELECTRORESPONSIVE APPARATUS
Jack C. Faglie, 143 Friar Tuck Road, San Antonio, Tex., assignor to Jack C. Faglie, trustee, San Antonio, Tex.
Filed Jan. 12, 1959, Ser. No. 786,230
16 Claims. (Cl. 317—27)

This invention relates to apparatus for detecting an unbalance in polyphase electrical networks and also to apparatus for automatically disconnecting and reconnecting polyphase loads from a polyphase system respectively upon detection of phase failure and phase restoration.

This invention is particularly useful in connection with polyphase electric motors and the like for automatically disconnecting the motor from the polyphase power source in the event of phase failure and to automatically restart the motor upon restoration of the phase. Such failure may consist of, for example, an open circuit in one phase conductor, a grounded phase conductor or a phase-to-phase short circuit.

In a three-phase three-wire system upon failure of one of the phase conductors only one phase will effectively remain. This is commonly called "single phasing" and results in a severe overload of the remaining phase and can cause damage to three-phase motors. One purpose of this invention is to detect "single-phasing" and disconnect a three-phase load, such as rotating machinery, from the electrical system upon detection of the phase fault, thereby preventing the load apparatus from becoming damaged.

One important feature of this invention is that on restoration of the power source to normal conditions the motor or other polyphase load may be automatically reconnected to the power source.

Detection of a phase failure is accomplished by detecting an unbalance of electrical conditions between two phase conductors in the polyphase system. This invention utilizes the difference in rectified voltage from the phase conductors as a criterion for detecting phase failure. That is, in a normally operating polyphase system rectified voltage and current from each phase will have a predetermined value with respect to another phase's rectified voltages and currents. It is the change in these relationships which may be used to indicate a phase failure.

Therefore, it is an object of this invention to provide apparatus for connection to a polyphase electrical system including means for rectifying each phase of the system and providing each rectified voltage to a discriminating circuit for comparison with the rectified voltage of a different phase and the discriminating circuit being responsive to a predetermined voltage difference between the two rectified voltages to actuate a control circuit.

It is another object of this invention to provide apparatus for connection to a polyphase electrical system having a rectifier for rectifying each phase of the system and having tapped resistances and capacitors in parallel circuit arrangements coupled between pairs of rectifiers on the rectified voltage side with the tap of the parallel circuit being coupled to a reference for completing a current path, and relay windings respectively coupled across each parallel combination and responding to any substantial voltage difference between the rectified voltages for providing contact closures indicative of the voltage comparison.

It is a further object of this invention to provide polyphase load protection from a phase failure in a polyphase electrical system wherein each phase of the system is rectified and compared with another phase rectified voltage in a voltage discriminating circuit connected between two rectified phase voltages, the number of discriminating circuits being one less than the number of phases, the discriminating circuits being suitably coupled to a line switching device for coupling the load to the system and are operable upon a voltage difference presented to the discriminating circuit to automatically disconnect the load and upon restoration of the phase which eliminates the predetermined voltage difference to automatically reconnect the load to the system.

These and other more detailed and specific objects will be disclosed in the course of the following specification, reference being had to the accompanying drawings, in which:

FIG. 4 is a schematic illustrating exemplary apparatus for providing phase failure detection for an N-phase electrical system.

FIG. 5 is a mixed schematic and block diagram illustrating apparatus for automatically disconnecting the load upon detection of a phase failure in the polyphase electrical system.

FIG. 6 is a mixed schematic and block diagram showing apparatus for automatically disconnecting the load from the system upon detection of a phase failure and for automatically reconnecting the load to the system upon detection of phase restoration.

Figure 1:
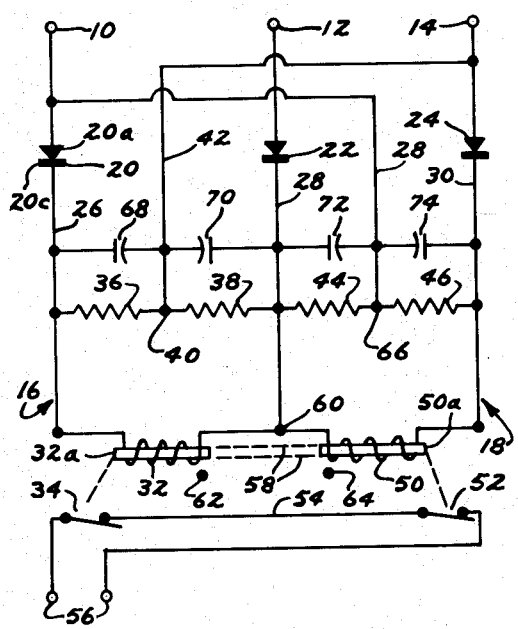
FIG. 1 is a schematic presentation of an exemplary embodiment of this invention.

With reference now to the figures, like numbers indicate like parts in the various schematics. In FIG. 1 input terminals 10, 12, and 14 connect the illustrated apparatus to three phase conductors (not shown) of a three-phase three-wire system. It is to be noted that voltage stepdown transformers (not shown), and the like, may at the option of the user be interposed between the illustrated apparatus and the said three phase conductors without affecting the operation of the FIG. 1 apparatus except as to voltages and currents involved. Also it is preferable that the said apparatus be properly fused.

Voltage discriminating circuits indicated generally by numerals 16 and 18 are connected to the three phase conductors (not shown) through terminals 10, 12 and 14 by rectifiers 20, 22 and 24, respectively. As used in this explanation the symbols indicating silicon diodes show the direction of conventional current flow to be in the direction of the arrowhead, such as 20$^a$ which in effect represents the anode while the cathode is represented by 20$^c$. It is understood that the diodes may be reversed and the operation of the circuit of FIG. 1 will remain the same. It is also understood that the said rectifiers may be of the usual silicon type and that in practice consist of several individual silicon diodes connected in series to provide a reverse breakdown voltage exceeding that of the single silicon diode. Therefore diode 20 may be symbolic of four silicon diodes cascaded in series circuit. In FIG. 1 the current and voltage from each phase conductor (not shown) is presented to lines 26, 28 and 30 as a half-wave rectified wave. As used herein and unless otherwise noted the term "voltage" means the voltage on a wire with respect to ground.

Connected between lines 26 and 28 is a relay coil 32 the armature of which is operatively connected to switch part 34 for opening and closing same as is herein described. The actuation force is proportional to the degree of unbalance of the polyphase system. When the phase conductors connected respectively to terminals 10 and 12 and arbitrarily termed as the first and second phases have balanced currents and voltages, the average voltage on line 26 will substantially equal the voltage on line 28. The voltages on lines 26 and 28 are taken from a predetermined reference voltage as will become apparent. The voltage imposed across relay coil 32 under balanced electrical conditions is either zero or a very small amount. As such, no or negligible current flows therethrough resulting in normally closed switch part 34 remaining closed. If, for example, the voltage and the current in the phase conductor connected to terminal 12 would change, either suddenly or gradually, a change in the voltage on line 28 corresponding to the change in voltage on the said phase conductor occurs. Then the difference in voltages on lines 26 and 28 appears across relay coil 32 and is indicative of the unbalance of voltages between the phase conductors respectively connected to terminals 10 and 12.

A predetermined reference voltage is provided to each discriminating circuit through resistances 36 and 38. In the FIG. 1 apparatus junction 40 between the said resistances is coupled to the other or third phase over line 42. With this connection the third phase acts as a predetermined reference voltage for discriminating circuit 16. Failure of either pase voltage between terminal 14 (third phase conductor) and the terminals 10 or 12 will result in a substantial pulsating D.C. voltage imposed across relay coil 32. As a result armature 32a is activated and is operative to open switch part 34. Switch part 34 being open provides an indication that the two phase voltages are unbalanced.

Now if the phase voltage between terminals 10 and 12 changes to an abnormal value there will be no D.C. voltage presented across coil 32. Such phase failure detection is included in the function of discriminating circuit 18. To provide a suitable reference voltage to circuit 18 resistances 44 and 46 are coupled over line 48 to the first phase conductor or terminal 10. Coil 50 is coupled between lines 28 and 30 as coil 32 is coupled between lines 26 and 28 to provide a voltage responsive device for indicating a phase failure in the phases between terminal 10 (first phase conductor) and either or both of the two terminals 12 and 14. Note that line 28 which carries the representative voltage and current from the second phase conductor (terminal 12) is connected to both circuits 16 and 18 thereby providing half-wave rectified voltage and current to both circuits.

For suitable indication of detection of a phase failure in the second or third phases switch part 52 is operatively connected to the armature 50a in coil 50 and is operated as switch part 34 is operated. When the said switch parts are connected in series circuit as by line 54 and to switch terminals 56 an electrical signal indication is provided in the form of an open circuit by the illustrated apparatus of a phase failure or severe unbalance of one or two phases as will become apparent from a reading of the following explanation.

When the apparatus of FIG. 1 is to be used to detect phase faults in an unbalanced three phase system, such as in an unbalanced X=connected system, resistances 36, 38, 44 and 46 may be of the adjustable type to provide adjustment of the voltages provided to the ends of the relay coils as will be later described.

Relay coils 34 and 50 may share a common armature as indicated by dotted lines 58. With this arrangement only one switch part such as switch part 34 is necessary. The coil arrangement including coils 34 and 50 is such that a current through either coil will actuate the common armature thus opening switch part 34. Care must be taken in orienting the windings to prevent during certain types of faults a cancellation of magnetic flux from the two coils 32 and 50 in the common armature. For example, if the phase conductor connected to terminal 12 is grounded, equal but oppositely polarized voltages will be imposed across coils 32 and 50, thus opposing currents will flow therethrough merging into a single current at junction 60. When the coils 34 and 50 are wound in the opposing manner as indicated by dots 62 and 64, the magnetic flux induced in the armature consisting of parts 30a, 50a and 58 will add, thereby causing switch part 34 to open. However, if the windings are wound in the same direction, i.e., wound such that a current entering the coils from like ends produce a magnetic flux in the same direction, a ground to terminal 12 will result in magnetic flux cancellation and a no fault indication when certain types of faults occur. Therefore, in a phase failure detection apparatus as shown in FIG. 1 wherein an input terminal such as terminal 12 provides voltage and current to two discriminating circuits such as circuits 16 and 18, care must be taken to ensure that there will not be cancellation of the electrical signals indicating a fault or faults. The same type of situation of poposing voltages being imposed across coils 32 and 50 occurs when both terminals 10 and 14 are grounded or are shorted to each other as will be later explained.

Detection of a grounded phase conductor will now be described. When a phase conductor is grounded the voltage thereon radically decreases with respect to the ungrounded phases. Therefore, in a grounded fault there is a relatively large potential provided across the relay coil having one end connected to the rectifier coupled to the grounded phase. For example, assume that the phase conductor (not shown) coupled to terminal 12 is grounded. The voltage potential on line 28 changes from some average value toward ground potential, the amount of change depending on the type and location of the ground. The other two current carrying lines 26 and 30 remain substantially at the normal voltage, thereby there is provided a substantial voltage across the relay coils 32 and 50 respectively in opposing directions.

The current paths provided in the above described fault include from terminal 10 and rectifier 20 through resistance 36 to terminal 14 and a second path from terminal 14. The voltage drop across resistance 38 tends to raise the voltage potential of line 28 above ground, however the voltage across coil 32 is quite substantial because of the considerably larger drop in voltage in resistance 36. Other grounded phase conductors result in voltage unbalances in the detector circuit in substantially the same manner as described.

Note that when the phase conductor (not shown) coupled to terminal 12 is grounded, currents will flow toward junction 60 in both coils 32 and 50, thus when a common armature is provided the magnetic flux generated by each opposing coil 32 and 50 current adds to actuate the switch part 34 and thereby indicate the fault.

Detection of a phase-to-phase short will now be described. A phase-to-phase short between terminal 12 and either of terminals 10 or 14 is detected in essentially the same way, i.e., the circuit behaves symmetrically. Detection of only one phase-to-phase short from the center or common terminal 12 to either of the other two terminals 10 or 14 will be described. For purposes of explanation detection of a short between terminals 12 and 14 is now described, for convenience the shorted terminals are indicated as terminals 12—14. The only completed circuit is provided when the wave on terminal 10 is positive with respect to the wave on terminals 12—14, it being understood that the three-phase system is now "single phased." Therefore rectified half-wave current flows in one direction only as will become apparent.

When the electric wave on terminal 10 is negative with respect to the electric wave on terminals 12—14, rectifier 20 is reverse biased to current cutoff. Thus the only effective electrical circuit involving terminal 10 during the latter situation is over line 48. The circuit is in two branches, the first branch being through diode 22 to line 28 thence through resistance 44 to line 48 and the second branch being through diode 24 to line 30 thence through resistor 46 to line 48. Since terminals 12—14 provide current to both just described current paths the voltage drops across resistances 44 and 46 are the same. Therefore there is no voltage difference between the ends of coil 50, resulting in no action to switch part 52. Since diode 22 is forward biased during these conditions and therefore an extremely low impedance, resistance 38 connecting terminal 14 to line 28 is effectively shorted out of the circuit. The remaining elements, namely, resistance 36 and coil 32, can also be considered as shorted out by diode 22. Therefore, the just described circuit branches when terminal 10 is negative with respect to termials 12—14 of FIG. 1 are ineffective to detect the described phase-to-phase fault.

The described phase-to-phase fault is detected by voltages imposed on the relay coils during the portion of the electrical cycle when the wave on terminal 10, i.e., the terminal not involved in the phase-to-phase fault is positive with respect to the wave on terminal 12—14. The circuit formed has four main branches. The first branch is through diode 20 (now forwardly biased to conduction) thence through resistance 36 and over line 42 to terminal 14. A second branch also starts through diode 20 thence through coil 32 and to junction 60 where it merges with other currents from the third and fourth branches to flow through resistance 38 thence over line 42 to terminal 14. The third and fourth branches start over line 48 to junction 66 where the third branch includes resistors 44 and 38. The fourth branch starts from junction 66 through resistor 46, coil 50 and resistor 38 to terminal 14. The latter two circuit branches do not include a rectification of the electrical current. Both rectifiers 22 and 24 are reversed biased to current cutoff and thus block lines 28 and 30 from terminals 12—14. From the above circuit tracing it is seen that coil 32 has a D.C. voltage thereacross equal to the difference of voltage drops across resistors 36 and 38.

The voltage on the phase-to-phase shorted conductors connected to terminals 12—14 is changed due to the difference in phase of the phase voltages provided to the lines from an electrical generator (not shown). In a three phase system each phase voltage is separated from the adjacent or next phase voltage by 120 degrees (electrical). Therefore the voltage attempting to be supplied to line 12 is 120 degrees (electrical) out of phase with the voltage on line 14. The actual voltage on the two shorted lines is the vector sum of the two voltages provided by the generator. Therefore, there is a change in the effective R.M.S. voltage potential provided. As a result of the described voltage change the voltage drop across resistance 36 is increased accordingly, thereby providing an increase in voltage across coil 32 in addition to the voltage provided thereacross due to the circuit behavior of the detector apparatus under the described fault conditions.

Under the above fault conditions and during the positive half-cycle of the voltage wave on terminal 10 the voltage across coil 32 is a substantial portion of the voltage difference between the effective rectified voltage from rectifier 20 and effective (R.M.S.) voltage on terminals 12—14. If the relay coils are chosen so the 60 cycle impedance is approximately that of each of the resistors 36, 38, 44 and 46 the voltage across the coil is about one-third of the said potential.

The third possible phase-to-phase short, wherein terminals 10 and 14 are shorted (hereafter referred to as 10—14 to indicate the phase-to-phase short), is detected by the circuit completed when the wave on terminal 12 (to terminal not involved in the phase-to-phase fault) is positive with respect to the wave on terminals 10—14. When terminal 12 is negative with respect to the shorted terminals, rectifier 22 is reverse biased to current cutoff, thereby presenting an effective open circuit to the faulty electrical system. The rectified half-wave current completes a circuit beginning through rectifier 22 then splits into four branches. Two of the branches consists of resistors 38 and 44 carrying current to lines 42 and 48, respectively, which are coupled to shorted terminals 10—14. The second pair of circuit branches begin at junction 60 thence through the relay coils 32 and 50, respectively, and resistors 36 and 46, respectively to lines 42 and 48 where the currents from the latter circuit branches merge with the first currents. In this phase-to-phase short circuit the currents in the relay coils flow in opposing directions in opposing windings or coils 32 and 50 to provide aiding fluxes in the common armature. The voltage across each coil is approximately the same as in the previously described phase-to-phase fault. Therefore it has been shown that the apparatus detects each possible phase-to-phase type of fault.

An open circuit fault presents the smallest voltage change to the discriminating circuits 16 and 18. In fact, the voltage presented across coils 32 or 50 may be sufficiently small to cause erroneous fault indications when filter capacitors 68, 70, 72 and 73 are not in the circuit as shown in FIG. 1. The purpose of adding the filter capacitors as shown in FIG. 1 is to smooth the half-wave rectified currents and voltages from the rectifiers 20, 22 and 24 to limit the phase-to-phase voltage difference caused by the electrical wave relationships between the three phases. Thus the capacitors smooth the rectified voltages and currents to provide less severe ripple voltages across the relay coils 32 and 50. It is understood that the inductance of the respective coils coacts with the capacitors in providing a smoothed rectified half-wave voltage. The values of the capacitors and resistances 36, 38, 44 and 46 is such that the composite time constant of the discriminating circuits 16 and 18 is at least greater than one electrical cycle. Detection of open conductor faults will now be described.

Of the three possible cases of open conductors in a three-phase three-wire system the cases involving the conductors coupled to terminals 10 and 14 will be discussed together as the circuit behaves symmetrically in this case as will become apparent. For purposes of discussion assume that conductor to terminal 10 is opened. Rectifier 20 is now considered out of the detector circuit. Both rectifiers 22 and 24 operate as without a fault thereby no substantial voltage difference is provided across relay coil 50. However, since rectifier 20 is effectively out of the circuit the source of current and voltage for discriminator circuit 16 is unbalanced as it is provided by rectifier 22 passing current and voltage to terminal 14. The current path is in two parts, one through resistor 38 and the second through coil 32 and then through resistor 36. The voltage across coil 32 is small as the current through resistor 38 which determines the voltage across coil 32 in this case is not increased over a no-fault condition. The coil voltage is diminished by the coil current through coil 32 causing a voltage drop across resistor 36, thus only a portion of the voltage drop across resistor 38 due to the current flow therethrough is presented to coil 32.

When the conductor connected to terminal 12 is opened a similar voltage is presented to each of coils 32 and 50. Rectifier 24 passes current through resistance 46 thence to terminal 10 providing a small voltage across coil 50 which causes current to flow toward junction 60. Similarly rectifier 20 passes current through resistance 36 to terminal 14 to provide a voltage across coil 32 causing current to flow therethrough toward junction 60. Both of the voltages are of the same order of magnitude as for the open conductor faults on either of terminals 10 and 14 provided respectively to coils 32 and 50.

Therefore when the apparatus of FIG. 1 is to be used to detect all three types of faults the relays including coils 32 and 50 should be adjusted to detect the open conductor faults. It is preferred that the illustrated filter capacitors be added to prevent erroneous fault indication.

Figure 2:
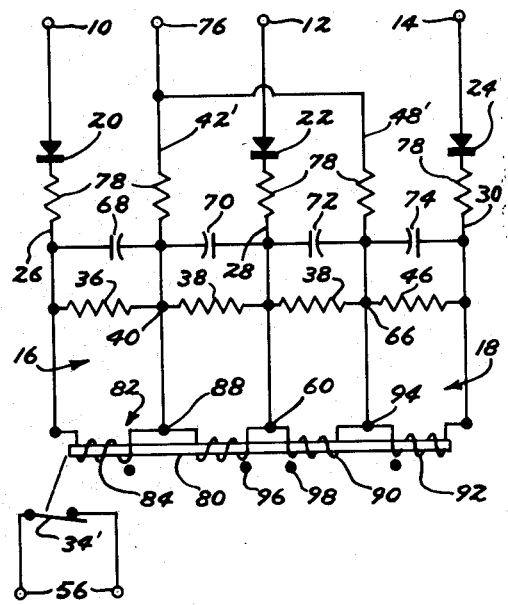
FIG. 2 is a modification of FIG. 1.

With reference now to FIG. 2 like parts are numbered as in FIG. 1. The illustrated apparatus is for use with a three-phase four-wire electrical system. The reference voltage to discriminator circuits 16 and 18 such as are provided to junctions 40 and 66 may be conveniently provided by the single neutral wire such as may be connected to neutral input terminal 76. Terminal 76 is coupled to the above junctions over lines 42' and 48'; the operation of the detector is now somewhat different as will be described.

In FIG. 2 there are inserted current limiting resistances collectively designated by numeral 78. The limiting resistances may be inserted only in lines 26, 28 and 30 or may also be inserted in the reference voltage lines 42' and 48'. It is understood that similar current limiting resistors may be utilized with the apparatus of FIG. 1 and are not essential to the successful operation of apparatus constructed according to this invention.

A different arrangement of relay windings is also provided in FIG. 2 and as shown all windings are wound on a single armature 80 operatively connected to normally closed switch part 34'. In FIG. 2 the center of the coils coupled to the cathodes of the rectifying elements as shown in FIG. 1 for coils 32 and 50 are provided with a tap for connection to the reference voltage. As shown in FIG. 2 coil 82 consisting of coil parts 84 and 86 have a tap 88 electrically connected to junction 40. Similarly coil parts 90 and 92 have a tap 94 interposed therebetween for connection to junction 66 and thusly to the neutral reference voltage as provided to terminal 76.

Assume for the moment that the three-phase system is balanced and operating normally. The voltages on lines 26, 28 and 30 are about equal in D.C. potential, therefore the voltage differences between the said lines and the single reference voltage as provided at 76 are equal. As such coil parts 84, 86, 90 and 92 have equal voltages thereacross with equal currents flowing therethrough. Since coil parts 84 and 86 are wound in a like direction the opposing currents flowing therethrough toward tap 88 induce opposing and cancelling fluxes in armature 80 permitting normally closed switch part 34' to remain closed. Similarly coil parts 90 and 92 have currents flowing therethrough to tap 94 providing opposing and cancelling fluxes in armature 80. As indicated by dots 96 and 98 the composite coil comprising parts 84 and 86 are wound oppositely to the composite coil comprising coil parts 90 and 92. Therefore the same opposing winding orientation is followed in providing the center tapped windings as will the windings illustrated in FIG. 1. As will be described the same underlying reasons require the particular winding orientation. One difference in the discriminator circuit operation in FIG. 2 with respect to FIG. 1 is that in FIG. 2 it is the summation of currents flowing in the coil parts that determines actuation of switch part 34'. Any unbalance in currents or voltages between the reference voltage and either end of the composite coil will cause actuation of the armature 80 in a degree proportional to the amount of unbalance.

Firstly, the detection of grounded conductor faults are described. As in the three-phase three-wire system a grounded conductor presents a very substantial voltage change on the phase conductor at fault, thereby presenting a substantial unbalance in the system. A ground in any one of the three phase conductors (not shown) behaves essentially the same way. Effectively the rectifying unit coupling the line to the discriminating circuit is decoupled (electrically) from the circuit. For example with terminal 10 grounded the anode of rectifier 20 is essentially at ground reference potential, which in this system is the reference voltage. Therefore any rectified current flowing through rectifiers 22 or 24 toward terminal 76 tends to make the cathode electrode of rectifier 20 positive with respect to ground, thereby reverse biasing rectifier 20 to current cutoff. As can be seen in FIG. 2 the rectified current through rectifier 22 flows through the current limiting resistor 78 toward junction 60, thence through coil part 86 and resistance 38 toward line 42'. Since terminal 76 is a ground reference potential the voltage drop across resistor 78 in line 42' will raise the voltage of junction 40 and thus line 26 to be positive with respect to ground. Coil part 86 is such that a substantial current therethrough and thus a substantial voltage thereacross will be operative on the armature 80 to open switch part 34' to provide a fault indication on switch terminals 56, the same as is provided with the apparatus of FIG. 1. In this arrangement it is seen that the voltage across coil part 86 is substantially the voltage difference between ground reference potential and the effective voltage provided by the half-wave rectification of the voltage on terminal 12. Grounded conductor faults in the conductors (not shown) connected to terminals 12 and 14 produce similar operation of the detector circuit as can become apparent by an examination of the circuit.

Detection of crossing of two phase conductors or a phase-to-phase short will now be described. As explained with reference to FIG. 1 the effective voltage on the two shorted or crossed phase conductors is changed somewhat due to the three-phase generator action and the vector summation of the generated voltages. This change in voltage is reflected in the operation of the discriminating circuits 16 and 18 in the same manner that was described for the three-phase three-wire system. The unbalance in R.M.S. voltage between the shorted or crossed phase conductors and the uncrossed conductor provides a difference in voltage across the respective coil parts therefore a different amplitude currents flow therethrough to actuate armature 80. It appears that the voltage across the coil parts during a phase-to-phase fault is somewhat less than in a grounded conductor fault, therefore in a system detecting both types of faults the relays should be adjusted to actuate on the smaller voltage unbalance.

The opened phase conductor type of fault in the three-phase four-wire electrical system causes a reaction in the detector circuit similar to the grounded phase conductor in the three-phase four-wire system, at least with the winding arrangement shown in FIG. 2. The opened conductor, such as connected to terminal 10, effectively removes rectifier 20 from the circuit. Therefore the rectified half-wave current flowing through rectifier 22 produces a voltage across resistance 38 and thus across coil part 86 which is the rectified half-wave voltage of a phase to ground. As such, coil part 86 has a greater current flowing therethrough than coil part 84. In fact coil part 84 is effectively out of the circuit except for the mutual inductance between the various coil parts as provided by armature 80.

In substituting the relay winding arrangement of FIG. 1 for that of FIG. 2, the operation of circuit in detecting an opened phase conductor is somewhat changed. In the above described fault wherein an open phase conductor is connected to terminal 10 the voltage across the coil is reduced. Instead of having the voltage from conductor 12 to ground reference potential across coil part 86, the difference in voltage drops across resistances 36 and 38 is provided across both coil parts 86 and 84, it being remembered in this latter case tap 88 is not connected to junction 40.

Thus there is shown how the circuit of FIG. 2 provides phase failure detection and suitable indication thereof at least for the three described types of polyphase electrical system faults.

Figure 3:
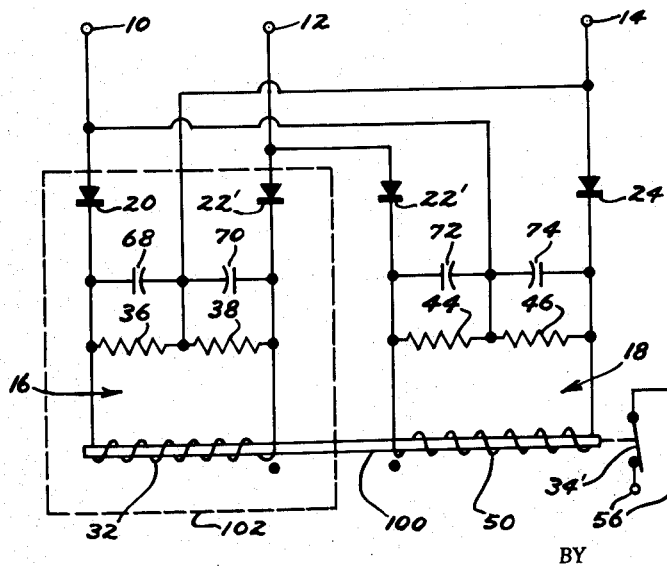
FIG. 3 is another embodiment of this invention.

FIG. 3 shows yet another embodiment of this invention wherein the rectifier 22 connected to terminal 12 has been replaced by two separate rectifiers collectively designated at 22'. The operation of the FIG. 3 apparatus can be compared with the FIG. 1 apparatus except where faults occur on the conductor (not shown) connected to terminal 12. Remember when terminal 12 was grounded or opened, resistors 38 and 44 provided additional circuit branches coupling terminal 10 to terminal 14. The embodiment of FIG. 3 eliminates these additional circuit branches by isolating discriminating circuit 16 from discriminating circuit 18 by the insertion of two rectifiers 22' as shown for rectifier 22.

The relay coils 32 and 50 of FIG. 3 may share common armature 100 which is operatively connected to switch part 34' as in FIGS. 1 and 2. It is to be understood that the relay coil arrangements of FIGS. 1 and 2 may be substituted for that of FIG. 3 and vice versa.

In FIG. 3 there is shown dashed box 102 enclosing the circuit components including discriminating circuit 16, relay coil 32, a part of common armature 100 and two rectifying elements 20 and 22' (one only). When the part of armature 100 is made separate as armature 32ª of FIG. 1 and a switch part 34 operatively connected thereto, the components in box 102 may be termed a modular package, i.e., a circuit which can be added to other circuits as a unit to form a phase failure detector. Thus the detector of FIG. 3 can be considered as two such modular units connected to make a three-phase three-wire phase failure detector.

An application of the present invention to N-phase electrical systems is shown in FIG. 4. Therein are shown terminals collectively designated by number 104 for connection to the first, second, third, . . . Nth phase as indicated by the number adjacent each terminal; any one phase being referred to as the "nth" phase. The rectifying units collectively designated by numeral 106 are connected as taught in FIGS. 1 and 2. In FIG. 4 there are $N-1$ discriminating circuits substantially identical to circuits 16 and 18 of FIGS. 1 and 2 and collectively designated by numeral 108. In each discriminating circuit there is a separate relay coil disposed about a separate armature operatively coupled to a switch part, the whole relay being collectively designated by numeral 110. It is understood that the other described relay coil armature and switch part arrangements may also be substituted for the illustrated one. The circuits shown in FIG. 4 operate in substantially the same manner as the circuit of FIG. 1.

In discriminating circuits 108 the resistances are shown as variable tapped resistances. With reference particularly to the circuitry enclosed by dashed box 110 the resistance consisting of 112 and 114 can be compared to resistance 46 of FIG. 1 while resistance 116 and 118 could be compared with resistance 44 of FIG. 1. By moving tap 120 which is coupled to end 122 of the relay coil of a relay 110 the voltage on end 122 is varied in event of a fault, and thus adjusting sensitivity of the discriminator circuit. The sensitivity change arises because an increase in the change in voltage on end 122 with respect to the voltage on end 126 for a given type of fault results in an increase in sensitivity. For example, at least during a fault wherein circuit 110 provides fault indication as hereinabove described, decreasing the resistances 112 and 114 causes the voltage on end 122 to approach more closely the reference voltage on tap 124, i.e., the greater is the change in voltage. Also by moving tap 124 either to the left or to the right the effect of the reference voltage during a phase fault on either end 122 or 126 of the said relay coil is varied, thus providing a sensitivity adjustment for unbalance between two phases and a reference voltage.

Intermediate discriminating circuits and phases not shown in FIG. 4 are indicated as being omitted by ellipses generally indicated by numeral 159. Thus there is shown structure according to the teachings of this invention applicable generally to polyphase electrical systems for phase failure detection.

With reference now to FIGS. 5 and 6 there are shown two ways of providing phase failure protection apparatus utilizing the circuits of FIGS. 1–4. In FIG. 5 there is shown how the detector circuit indicated by box 128 is connected to a polyphase power source and to a line connector for polyphase load. It is understood that any of the circuits or combinations thereof may be contained in the detector schematically represented by box 128. In box 128 terminals 10, 12, 14 and 56 correspond to the like numbered terminals in FIGS. 1, 2, 3 and 4, and it is to be understood that the circuitry connected thereto in said figures is also connected thereto in box 128.

Three-phase power is provided by the three phase conductors 130, 132 and 134 through line connecting apparatus indicated generally by numeral 136 and over lines 138, 140 and 142 to a three-phase load 144, such as a three-phase electric motor. The line connector (motor starter) 136 has the usual starting switch 146 and the stop 148. A simplified schematic of a line connector is shown as consisting of electromagnet 150 operatively connected to line switches collectively designated by 152, which respectively connect lines 130, 132 and 134 to lines 138, 140 and 142.

To provide power to the three-phase load 144 switch 146 is closed thereby completing a circuit from conductor 134 via line terminal 154 and control terminal 156 through switches 146 and 148 thence to control terminal 158 through the winding of electromagnet 150 and to line 130 by line terminal 160. With electromagnet 150 energized line switches 152 and control switch 162 are closed. Control switch 162 is in parallel circuit to start switch 146, both being coupled to terminals 156 and 164, and acts as a hold contact to keep electromagnet 150 energized after switch 146 is opened after the load 144 has been suitably started or energized. Not shown in the line connector 136 are the usual overcurrent protection devices. To stop the motor or to disconnect the load 144 from the three-phase power, switch 148 is depressed to open the circuit including electromagnet 150, thereby causing the line switches 152 and the control switch 162 to open. With switch 162 opened switch 146 must again be depressed to complete the starting circuit.

The detector 128 has its input terminals 10, 12 and 14 respectively connected to one phase conductor of the three phase system such as conductors 130, 132 and 134. The switch terminals 56 between which are the normally closed switch parts as shown in FIGS. 1–4 are connected between stop switch 148 and control terminal 158. Thus when switch part 34 or 34' is opened in the phase failure detector 128 the opened switch breaks the circuit to the electromagnet 150 to disconnect the load 144. Thus detection of a fault will cause disconnection of the load. To reconnect the load the start switch 146 is closed.

FIG. 6 illustrates connections of the phase failure detector for automatic disconnection of the load 144 upon detection of a fault and for automatic reconnection of the load 144 to the three-phase power upon elimination of the fault. The same line connecting equipment 136 can be utilized for the automatic control of the load connection as was illustrated for the manual version. Control terminal 156 is directly coupled to one terminal of terminals 56, the other terminal is coupled to control terminal 158. It may be desirable to exercise a certain amount of manual supervisory control over the load, therefore operate switch 166 may be inserted between terminals 56 and the control terminals 156 and 158. When switch 166 is opened the load 144 is not to operate, while when switch 166 is closed load 144 operates under the fully automatic control of the phase failure detector 128.

In the fully automatic connection of the detector 128 the control switch 162 is not necessary for keeping electromagnet 150 energized and as a result there is no connection to terminal 164. The normally closed switch part(s) in detector 128 keep electromagnet 150 energized during normal power source operation. A fault detection causes either switch part 34 or 52 to open, thereby disconnecting electromagnet 150 which opens switches 152 to disconnect the load. Upon removal of the fault, balance is restored to the various phases and the detector permits the switch part(s) therein to reclose which is operative to automatically reconnect the load to the power.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. An electroresponsive apparatus for connection to a polyphase electrical system having N phase conductors, comprising; N asymmetrical current conducting devices, each having a first terminal for connection to respective phase conductors and a second terminal for providing a uni-directional voltage; $N-1$ impedance means interconnecting the second terminals on different pairs of said asymmetrical current conducting devices, each of said impedance means including an intermediate terminal; means interconnecting said intermediate terminals to first terminals of different asymmetrical current conducting devices; and voltage responsive means connected to each of said impedance means so as to be responsive to the voltage across each of said impedance means.

2. Apparatus as in claim 1 wherein the voltage responsive means comprises a relay having a tapped winding with the ends thereof respectively connected to the said second terminals of the 1st and Nth rectifier, and the winding taps alternately connected to the second terminals of the remaining rectifiers and the taps in the impedance networks with the orientation of the winding reversing at each connection to a rectifier.

3. A detector for detecting an unbalance of electrical conditions between phases in a polyphase electrical system, including a plurality of phase conductive means for deriving currents from each phase conductor indicative of the electrical conditions therein, separate rectifying means coupled to said current deriving means for rectifying respectively the currents derived from each phase conductor, the number of phase conductors of electrical lines respectively coupled to the separate rectifying means for respectively carrying the rectified currents therefrom, neutral current return means coupled to the polyphase system, at least one impedance coupled between each line and the neutral current return means, a voltage developed across each impedance indicative of the current amplitude in said line, the number of lines minus one voltage responsive means respectively interconnecting lines having currents derived from adjacent phases and each being in parallel circuit relationship respectively to two of the said impedances, and said voltage means being responsive to a predetermined voltage across any of said two impedances to actuate an electrical apparatus for indicating electrical unbalance in the polyphase system.

4. Apparatus for detecting the electrical unbalance in a polyphase electrical system comprising, means for deriving voltage and current from each phase conductor indicative of the electrical conditions therein, separate rectifying means respectively coupled to said current deriving means for respectively rectifying the currents from each phase, the number of phases of electrical lines respectively coupled to the separate rectifying means for carrying the said currents therefrom, the number of phases minus one discriminating circuits, each of said circuits including a tapped impedance disposed in parallel circuit arrangement with a voltage responsive device, the said discriminating circuits being electrically coupled between two current carrying lines with the tap of the impedance being electrically coupled to one phase of the polyphase electrical network not providing current to either of said two current carrying lines, the current from said two lines flowing through said impedance to said one phase thereby providing a voltage potential across both impedances, said potential changing radically during substantial current unbalance between any two lines to actuate the voltage responsive device for indicating unbalance in the polyphase system.

5. A three-phase electroresponsive system, comprising first, second and third rectifying means each having output terminals and their respective inputs coupled to first, second and third phase conductors of a three phase electrical system, first and second discriminating circuits having two input terminals and an electrically intermediate neutral terminal, the first discriminating circuit having its two input terminals respectively coupled to the output terminals of the first and second rectifying means and its neutral terminal coupled to the third phase, the second discriminating circuit having its two input terminals respectively coupled to the output terminals of the second and third rectifying means and its neutral terminal coupled to the first phase, and indicating means coupled and being responsive to said discriminating circuits for providing a signal indicative of electrical unbalance between the outputs of said rectifying means.

6. A polyphase electroresponsive system, comprising a plurality of rectifying means respectively having their inputs coupled to a one phase conductor of a polyphase system and each having an output terminal for providing a rectified current indicative of the voltage-current conditions on the phase conductor connected to the respective input, the number of phases minus one discriminating circuits respectively coupled between two output terminals providing currents from adjacent phases occurring in one electrical cycle, the discriminating circuit having a neutral terminal electrically interposed between the coupled output terminals and being coupled to a predetermined voltage, and said discriminating circuit having indicating means for providing signals indicative of the current amplitude relationships between the various phases.

7. Apparatus as in claim 6 wherein the predetermined voltage is a non-adjacent phase of the said electrical cycle.

8. Apparatus as in claim 6 wherein the predetermined voltage is the neutral conductor in a polyphase system.

9. A three-phase electroresponsive system, comprising first, second, third and fourth rectifying means having output terminals and input terminals, a three phase system having first, second and third phase conductors, the first rectifying means input terminals being coupled to the first phase conductor, the second and third rectifying means input terminals coupled to the second phase conductor, the fourth rectifying means input terminals coupled to the third phase conductor, first, second, third and fourth networks including a resistor and capacitor in parallel and having a time constant substantially greater than one electrical cycle of the three phase system, the first and second networks being respectively electrically coupled between the third phase conductor and the output terminals of the first and second rectifying means, the third and fourth networks being respectively coupled between the first phase conductor and the output terminals of the third and fourth rectifying means, a first and second relay winding respectively coupled between the output terminals of the first and second rectifying means and between the output terminals of the third and fourth rectifying means, and switch means operatively connected to said relay windings for indicating the state of balance or unbalance of the three phase electrical system.

10. A polyphase electroresponsive system comprising, three input lines, three rectifiers having their like electrodes respectively coupled to said lines, and each having another electrode, two resistances respectively coupling said another electrode of one of said rectifiers to the said another electrodes of the other two rectifiers, said resistances each having a variable center tap for connection to a reference voltage, two relay windings disposed in parallel circuit arrangement to said resistances and each winding having a center tap respectively coupled to the resistance center tap, and switching means operatively connected to said windings.

11. A protective circuit for a polyphase load comprising, a polyphase power source, normally open electromagnetically operated switches for connecting the power source to a polyphase load, control means responsive to the electrical conditions of the power source for closing and opening said switches, said means including separate two terminal rectifiers having one terminal respectively coupled to each phase of the power source, the number of phases minus one voltage discriminating circuits respectively electrically coupled between the other terminals of two rectifiers, and each voltage discriminating circuit being responsive to a substantial voltage between said other terminals of its respectively connected two rectifiers to open said switches and responsive to an insubstantial voltage therebetween to close said switches.

12. A protective circuit for a polyphase load comprising, a polyphase inductive load, electromagnetically operated line switches for coupling the power load to a suitable polyphase power source, automatic line switch controls including separate rectifiers having first terminals for respective connection to phases of said suitable power source, second terminals on each of said rectifiers for providing rectified voltage and current from said power source, the number of phases minus one tapped impedances respectively connected between two of said second terminals, the tap of said tapped impedances being respectively coupled to a first terminal of a rectifier whose second terminal is connected to a different one of said impedances, relay coils sharing a common armature and respectively connected in parallel circuit to each of said tapped impedances, relay contacts actuable by said armature and electrically connected to cause said electromagnetically operated line switches either to close or to open.

13. Apparatus as in claim 12 wherein all of the taps are connected to a neutral conductor.

14. A protective apparatus for a three phase system, comprising a three phase load connecting device having three-phase line and load terminals and electromagnetically operated three phase switches coupled to said terminals and control terminals coupled to electromagnet means for operating the switches, a phase failure detector having first, second and third input terminals respectively coupled to said three phase line terminals and two switch terminals connected respectively to the control terminals of said device, the detector further including first, second and third rectifiers each having one electrode respectively coupled to said three input terminals and the other rectifier electrode having a rectified electrical potential thereon, a first resistive-capacitive parallel combination coupled between the first rectifiers, said other electrode and the third input terminal, a second resistive-capacitive parallel combination coupled between the other terminal of the second rectifier and the third input terminal, third and fourth resistive-capacitive parallel combinations coupled to the first input terminal and respectively to the other electrodes of the second and third rectifiers, and electromagnetic actuating switch means coupled to the other electrodes of the rectifiers and being operatively and electrically coupled to the device's control terminals for operating said electromagentic three phase switches for opening said switches whenever the voltage between any two of said other electrodes exceeds a predetermined potential.

15. Electroresponsive apparatus comprising, a plurality of input terminals, each adapted for direct connection to one phase conductor of a polyphase system; a plurality of tapped impedance means corresponding in number to one less than the number of phases in said system; circuit means including asymmetrical current conducting means connecting each of said impedance means intermediate different pairs of input terminals whereby the current flow through the taps on said impedance means is uni-directional when said system is balanced; circuit means connecting the taps on each of said impedances to input terminals other than the pair to which each of said impedances is connected; and voltage responsive means connected across each tapped impedance means and being responsive to a predetermined voltage thereacross to indicate a predetermined voltage difference between phases of said system.

16. An electroresponsive apparatus for being directly connected to a polyphase electrical system comprising a number of phases of terminals, the number of phases of separate impedance means respectively electrically connected between the terminals, a single additional impedance means connected between any two of said terminals, separate rectifying means respectively interposed between said terminals and said impedance means such that one end of all the impedance means respectively have a like end of one of the rectifying means connected thereto with each impedance means other ends being respectively directly connected to one of said terminals, each rectifying means being connected to a different terminal, and voltage responsive means connected between all of the said rectifying means like ends for sensing a predetermined voltage difference therebetween.

References Cited in the file of this patent
UNITED STATES PATENTS

| | | |
|---|---|---|
| 1,888,718 | Friedlander | Nov. 22, 1932 |
| 1,980,395 | Fitzgerald | Nov. 13, 1934 |
| 2,242,950 | Harder | May 20, 1941 |
| 2,474,290 | Terry | June 28, 1949 |